US007093393B2

(12) United States Patent
Hock et al.

(10) Patent No.: US 7,093,393 B2

(45) Date of Patent: Aug. 22, 2006

(54) PROFILED FRAME

(75) Inventors: Michael Hock, Grossostheim (DE); Juergen Hock, Grossostheim (DE); Thomas Krebs, Wiesen (DE); Thomas Krimm, Aschaffenburg (DE); Thomas Ueberreiter, Muehlheim (DE); Klaus Vath, Leidersbach (DE)

(73) Assignee: Wagon Automotive GmbH, (DE)

( * ) Notice: Subject to any disclaimer, the term of this patent is extended or adjusted under 35 U.S.C. 154(b) by 217 days.

(21) Appl. No.: 10/720,370

(22) Filed: Nov. 24, 2003

(65) Prior Publication Data

US 2004/0123526 A1 Jul. 1, 2004

(30) Foreign Application Priority Data

Nov. 26, 2002 (DE) ................................ 102 55 251

(51) Int. Cl.
*B60J 5/04* (2006.01)
*E06B 3/00* (2006.01)
*E06B 7/16* (2006.01)

(52) U.S. Cl. ......................... 49/502; 49/506; 49/490.1; 296/146.9

(58) Field of Classification Search .................. 49/502, 49/506, 490.1, 495.1, 475.1, 489.1; 296/146.5, 296/146.2, 146.9, 146.1; 29/897.2
See application file for complete search history.

(56) References Cited

U.S. PATENT DOCUMENTS 5,107,624 A * 4/1992 Passone ....................... 49/502
5,983,571 A 11/1999 Takeda et al. ................ 49/502
5,992,021 A 11/1999 Takeda et al. ............. 29/897.2
6,016,630 A 1/2000 Takeda et al. ................ 49/502
6,112,470 A * 9/2000 Hashimoto et al. ........... 49/502
6,668,490 B1 * 12/2003 Hock et al. .................... 49/502
6,928,735 B1 * 8/2005 Malik et al. ............... 29/897.2

FOREIGN PATENT DOCUMENTS

| | | |
|---|---|---|
| DE | 19630148 | 1/1997 |
| DE | 19705371 | 11/1997 |
| DE | 198 54 775 | 8/1998 |
| DE | 19829457 | 5/1999 |
| DE | 19929872 | 1/2001 |
| DE | 101 05 603 | 2/2001 |
| DE | 10063459 | 6/2002 |
| EP | 0437188 | 7/1991 |

OTHER PUBLICATIONS

Klaus et al, English Abstract of DE19929872, Published Jan. 11, 2001.

* cited by examiner

*Primary Examiner*—Hugh B. Thompson, II
(74) *Attorney, Agent, or Firm*—Andrus, Sceales, Starke & Sawall LLP

(57) ABSTRACT

A profiled frame, as a window frame and/or door frame of a motor vehicle door or lid, is manufactured as a roll formed profile from flat strip material, in particular from flat steel, with a preferably closed hollow profile and with preferably at least one flange following the progression of the hollow profile, and with at least one contact surface (15) and/or one attachment formation (16) on the hollow profile and/or the flange. At least one contact surface (15) and/or attachment formation (16) is fashioned into an additional profile which is separate from a hollow profile, and that the additional profile is permanently and rigidly connected with said hollow profile, in particular welded to it.

33 Claims, 5 Drawing Sheets

PROFILED FRAME

FIELD OF THE INVENTION

CROSS REFERENCE TO RELATED APPLICATIONS

This application claims priority from German Patent Application No. 102 55 251.7, filed Nov. 26, 2002.

BACKGROUND AND SUMMARY OF THE INVENTION

The invention pertains to a profiled frame as a window frame and/or door frame of a motor vehicle door or lid with the characteristics set forth herein, a motor vehicle door or lid with such a profiled frame and a method for manufacturing such a profiled frame.

The state of the art regarding profiled frame doors, as well as the alternative punched shell doors, are explained in detail in DE 198 54 775 A1, to which reference shall be made herein as background. The profiled frame door according to this state of the art features a consistently identical built-in width of the profiled frame, with changes in the effective built-in width of the vehicle door implemented by means of add-on parts on the profiled frame. These add-on parts are mounted to the profiled frame in the final state, i.e. with the profiled frame completely formed.

A flange, which is tipped to a certain degree and at which a seal contact or attachment surface is fashioned, is integrated from the outset into the profiled frame, which is manufactured as a roll formed profile from flat strip material (DE 101 05 603 A1). This profiled frame is made of flat steel or flat light alloy. Where applicable, the flange is immediately trimmed to a shorter length than the hollow profile. In this context it is already known in the art to provide partial notches and trims in order to facilitate shorter bending radii or to correct changes in shape caused by the stretching process. This is the state of the art that the present invention is based on.

During roll forming, a profiled bar with a desired cross-section is produced from flat strip material, in particular flat steel, by several profiled roll pairs arranged one after the other and aligned differently. This profiled bar, which initially is produced from the coil as an endless product, is then cut to length after leaving the last profiling stage. The final product is thus a straight profiled bar with the desired geometry and the desired original length.

Right from the onset, the profiled bar is provided with appropriate contouring featuring seal contact surfaces and/or seal attachment formations or other profiles. According to the present invention, the contact surfaces and the attachment formations are in particular intended for seals, but they can also be used as an attachment or contact for other add-on parts.

The invention is based on the task to provide a profiled frame of the aforementioned kind which could be manufactured and installed in an even more optimal fashion. The same task applies to the further development of a motor vehicle door or lid, and to the embodiment of the manufacturing method known in the art.

The important issue is that the design of the profiled frame according to the invention adopts the basic hollow profile, which constitutes its foundation and is manufactured as a roll formed profile, from the state of the art, but that in doing so it also assign other functions, cross-sections and attachment possibilities to said hollow profile, especially at its ends, without increasing the complexity of its manufacture. On the contrary, by dividing the profiled frame into at least two separate profiles which are permanently and rigidly connected with each other, it is possible to achieve an optimal assignment of functions and requirements.

BRIEF DESCRIPTION OF THE DRAWINGS

Below, the invention shall be explained in more detail with the aid of drawings depicting exemplified embodiments thereof. The figures are showing.

DETAILED DESCRIPTION OF THE PREFERRED EMBODIMENT

Figure 1:
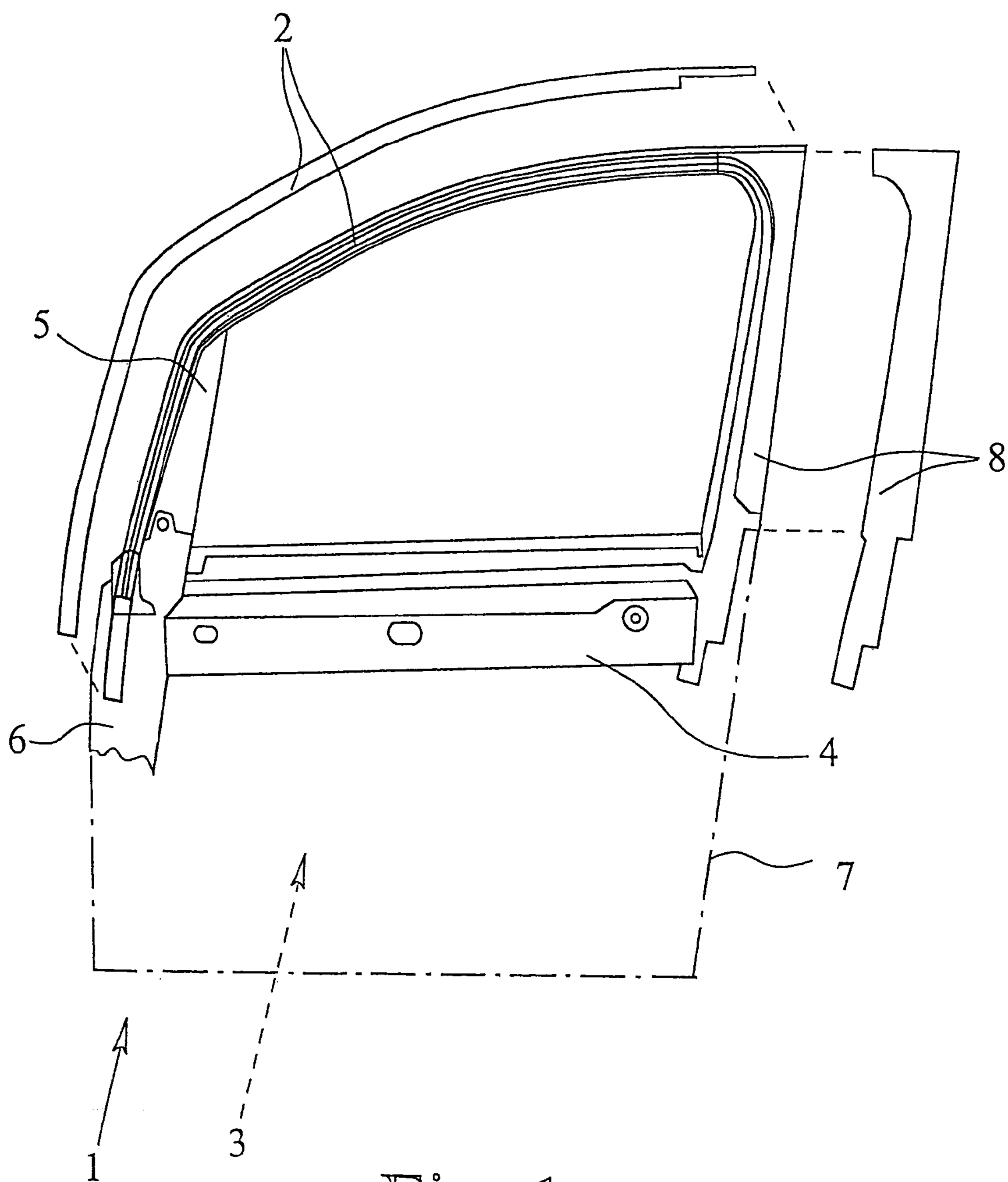
FIG. 1 a schematic view of a motor vehicle door with a profiled frame as the window frame, then added again separately as a ready component, FIG. 2 the end area of the profiled frame of FIG. 1 in the door box below the parapet line, FIG. 3 a section through a profiled frame, the state of the art constituting the starting point, manufactured completely as a one-piece roll formed profile from flat strip material, FIG. 4 a schematic view of a stretched profiled bar, which will eventually constitute the profiled frame according to the invention, FIG. 5 sections A—A, B—B, C—C, D—D, as indicated in FIG. 1, FIG. 6 the upper corner area of a motor vehicle door according to the invention in a raw state, and FIG. 7 the same corner area as in FIG. 6, now equipped with an add-on part.

FIG. 1 shows a motor vehicle door 1 as an example of the application of the invention. The door could also be substituted with a motor vehicle lid, for example a deck lid. The motor vehicle door 1 comprises at least one profiled frame 2, which in this exemplified embodiment is shown as the window frame of the motor vehicle door 1. Many embodiments are possible here, for example as a door frame, or as a combined window and door frame, a so-called door window frame. Also indicated is the outer door wall 3 of the motor vehicle door 1, a window well profile 4 which can function as a side impact protection at the same time, a mirror triangle 5 on a hinge bracket 6 of the door box 7, which is only indicated, as well as a reinforcement profile 8 on the B-pillar. With regard to the details of the design of the corresponding motor vehicle door, reference is made to the aforementioned state of the art.

Figure 3:
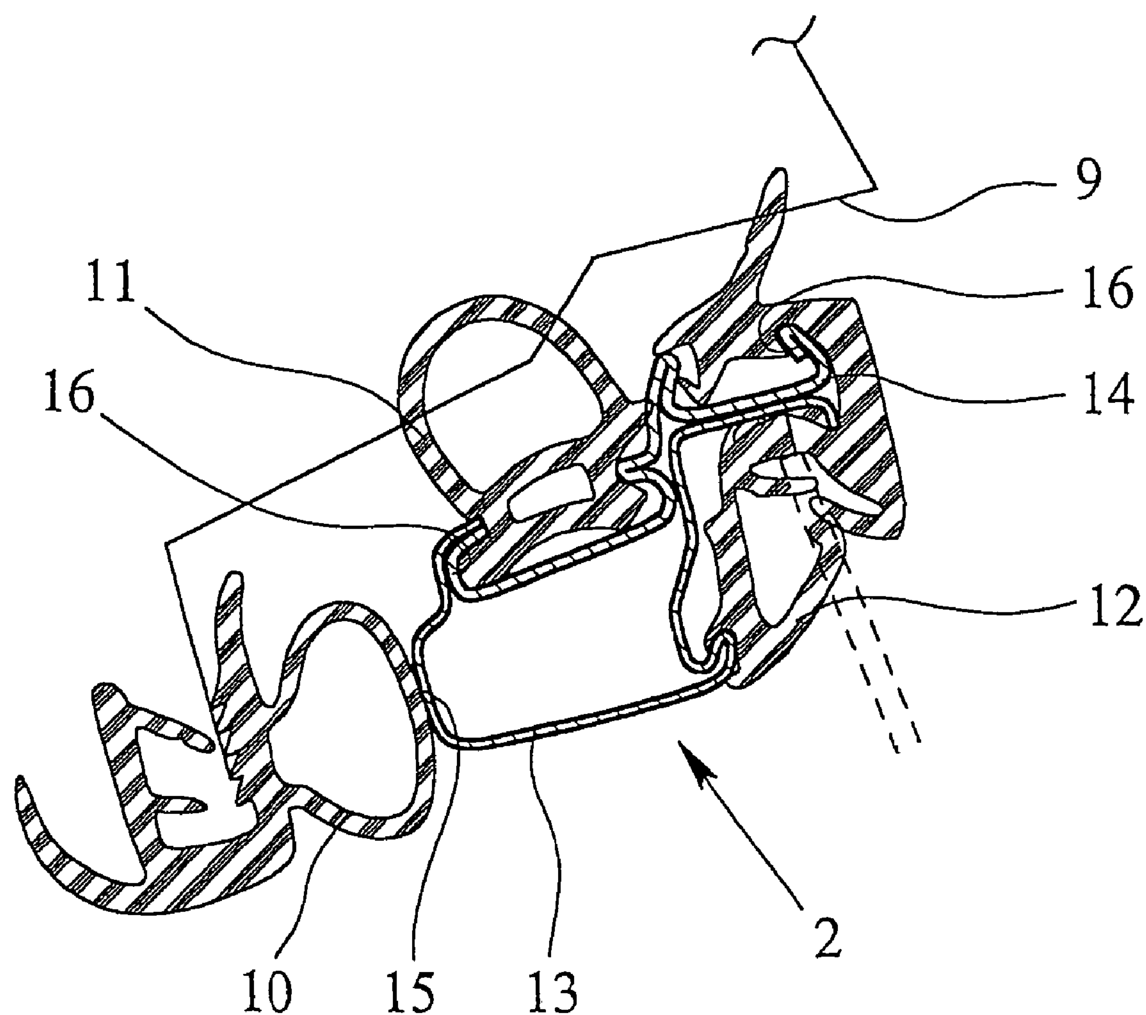

The profiled frame 2 of the motor vehicle door 1 is used for guiding the pane, for the overall stiffening of the motor vehicle door 1 and for sealing the motor vehicle door 1 in the dedicated car body cut-out 9 (FIG. 3). FIG. 3 shows that the circumferential seal 10 is attached in the car body cut-out 9, another seal 11 is attached to the profiled frame 2, and a window guiding seal 12 is also attached to the profiled frame 2. All this is shown in FIG. 3 with the section of a profiled frame 2 according to the state of the art, said profiled frame 2 manufactured completely as a one-piece roll formed profile.

The profiled frame 1 in FIG. 3 achieves its torsional stiffness from the at least one hollow profile 13 formed in it. In the exemplified embodiment, the hollow profile 13 features a flange 14 following the progression of the hollow profile. In the exemplified embodiment, the progression of the hollow profile 13 is characterized by an unchanging cross-section.

The seals 10, 11, 12 correspond to various counter elements, such as a seal contact surface 15 on the hollow profile 13 and a seal attachment formation 16, also on the hollow profile 13. The seal attachment formation 16 on the hollow profile 13 has a C-shape here in order to hold the complementarily shaped seal 11 with its foot. FIG. 3 also shows another seal attachment formation 16' on the flange 14.

The seal contact surface 15 and the seal attachment formations 16, 16' can be used not only as a contact or attachment for seals, but can also have other functions which are desired for the profiled frame 2.

Figure 4:
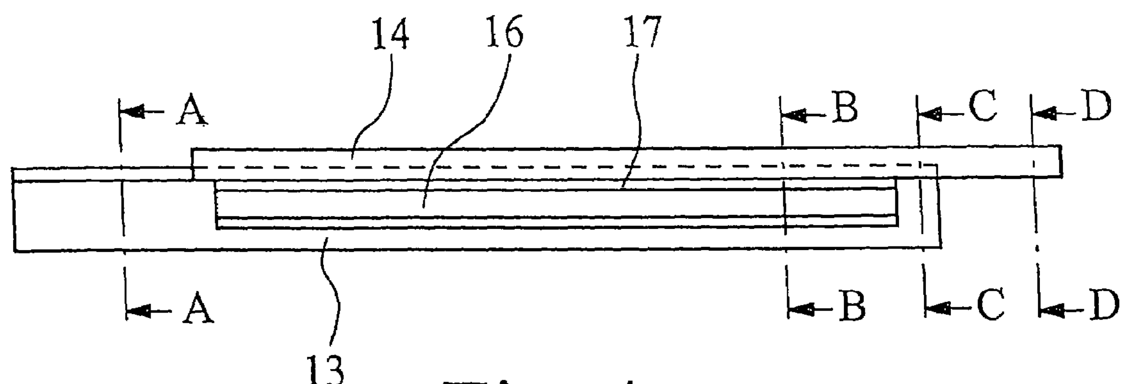
Figure 5:
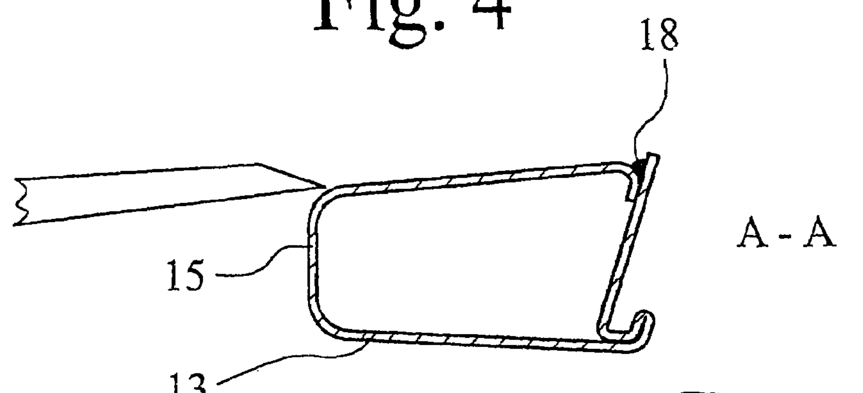
Figure 5:
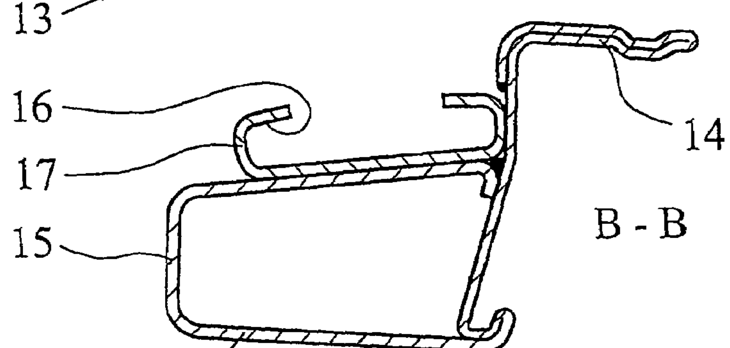
Figure 5:
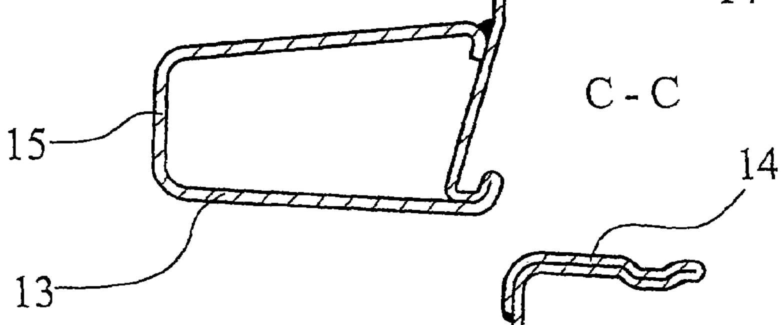

FIG. 4, in connection with FIG. 5, shows the specifics of the teaching of the invention. These figures show that at least one seal contact surface 15 and/or seal attachment formation 16 is fashioned on an additional profile 17 which is separate from the hollow profile 13, and that the additional profile 17 is permanently and rigidly connected with the hollow profile 13, in particular welded to it. In the exemplified embodiment the additional profile 17 comprises the C-profile of the state of the art shown in FIG. 3, its intended purpose being to hold the seal 11. While the seal contact surface 15 on the hollow profile 13 can be fashioned according to FIGS. 4 and 5 in a simple and obvious manner, the seal attachment formation 16 for the seal 11 has moved into the separate additional profile 17 permanently and rigidly connected with the 13, in particular welded to it. This creates additional flexibility in the design of the profiled frame 2.

Although not absolutely necessary within the context of the invention, the additional profile 17 is preferably manufactured as a roll formed profile of flat strip material, in particular flat steel. This means that the profiled frame 2 is "assembled" from a total of two profiles, the hollow profile 13 and the additional profile 17, both of which are manufactured as roll formed profiles.

FIG. 4 shows that the lengths of the hollow profile 13 and of the additional profile 17 differ from each other. The additional profile 17 is slightly shortened at both ends compared to the hollow profile 13. This will be explained in more detail later.

FIG. 4 further shows that the lengths of the hollow profile 13 and the flange 14 differ from each other, and that the lengths of the additional profile 17 and the flange 14 differ from each other as well. In the exemplified embodiment, the flange 14 at one end clearly extends beyond the end of the hollow profile 13 and even more clearly beyond the end of the additional profile 17, and is used at this end to anchor the profiled frame 2 to the B-pillar, and to form a connection with the reinforcement profile 8 there.

At the other end, the hollow profile 13 projects over the flange 14 quite considerably, i.e. in the exemplified embodiment, the flange 14 has been cut to a certain length by the hollow profile 13. In a ready assembled motor vehicle door, the hollow profile 13, having said length, enters the door box 7, and can be used for anchoring the profiled frame 2 in the door box 7.

Figure 2:
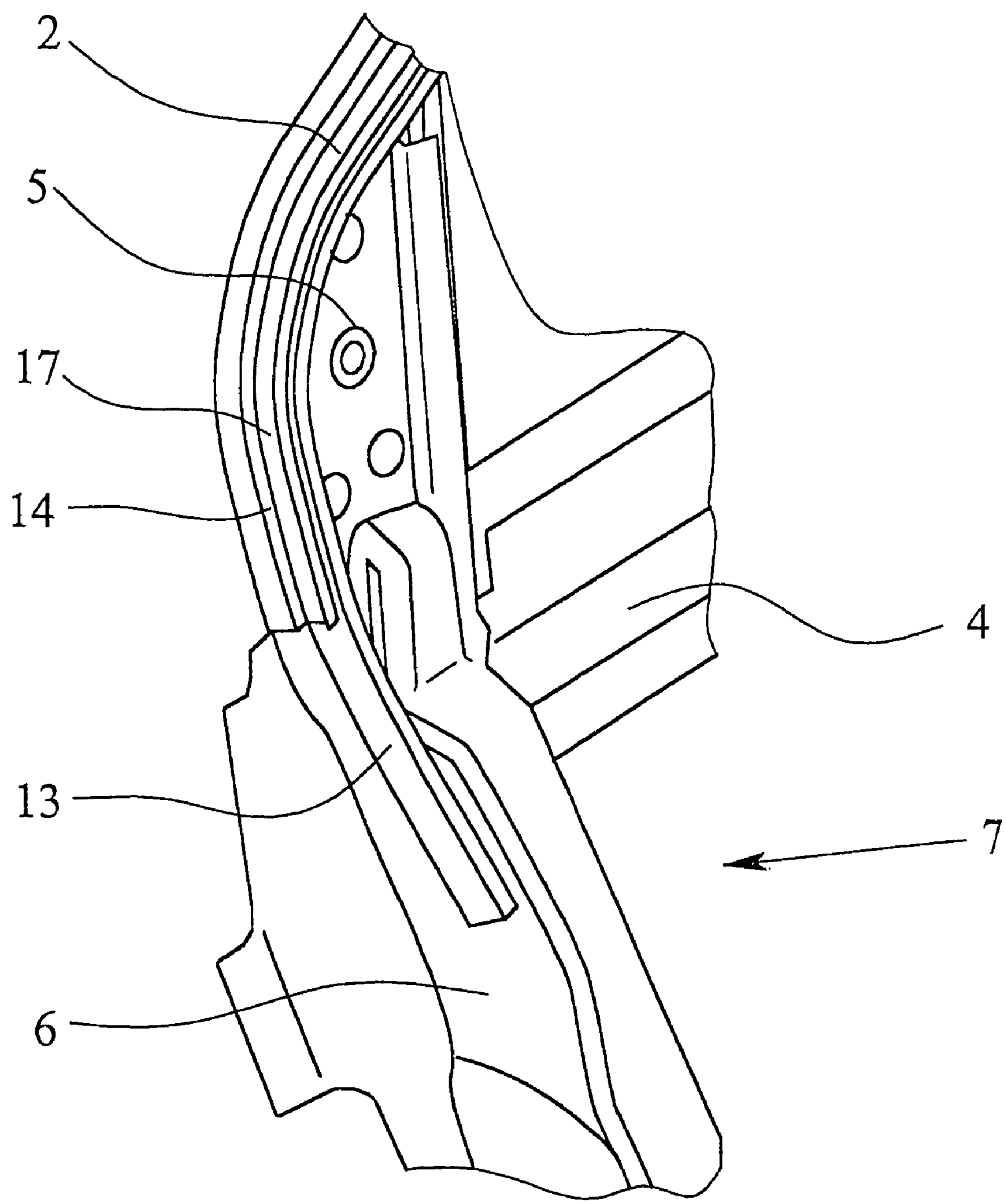

For the aforementioned purpose, the hollow profile 13 features a considerable excess at at least one end, in particular an excess of 20 mm to 120 mm, preferably an excess of 30 mm to 80 mm, for anchoring the profiled frame 2 below the parapet line in the door box 7 of the motor vehicle door or lid. This excess can be recognized especially well in FIG. 2. There, the hollow profile 13 is connected with the hinge bracket 6 in the door box 7 in a high rigidity and torsionally stiff manner by welding and/or a threaded joint.

FIG. 5 shows various cross-sections through the profiled frame 2 from FIG. 4, in the exemplified embodiment consisting according to the invention of the 13, the flange 14 and the additional profile 17. Section B—B shows the entire profile of the profiled frame 2. The additional profile 17 is welded to the hollow profile 13. Section A—A shows the end of the profiled frame 2, which in FIG. 4 is to be found on the left hand side and which is located in the door box 7 when installed. The additional profile 17 is not present here. The flange 14, originally present in this area after fashioning the hollow profile 13, has been cut away in a manner shown in FIG. 5 A—A by means of an indicated cutting knife or edging tool.

Section A—A shows a special feature resulting from the fact that the hollow profile 13 is closed off by welding and that the weld seam 18 of the hollow profile 13 is located within the outer contour of the hollow profile 13. It can be seen that the weld seam 18 will not be damaged when the flange 14 is cut in this area. Thus, the hollow profile 13 remains undamaged and highly rigid, continuing to form a closed hollow chamber. That also aids the aforementioned anchoring in the door box 7.

Section C—C shows the other end area, with the additional profile 17 recessed somewhat in this area, and thus is no longer present in section C—C. In this area, the recessed additional profile 17 opens new possibilities for the connection of the profiled frame 2 with the reinforcement profile 8 located on the B-pillar. In this respect, appropriate measures can also be taken at appropriate locations in the rear door.

Section D—D shows how the flange 14 continues alone in this area. The hollow profile 13 itself has been cut to a shorter length here.

The presented form of the profiled frame 2 is merely an example. The most important fact is that the profiled frame is composed of at least two partial profiles, the hollow profile 13 and the additional profile 17, which are connected, in particular welded. This ensures the high flexibility of the design which has already been indicated before. Special requirements for each motor vehicle door or lid, which depend on the individual car body, must be satisfied at the ends of the profiled frame 2 more than anywhere else. Here, the profiled frame 2 according to the invention offers more flexible possibilities of adaptation than the profiled frame 2 known from the state of the art, at least if one considers the difficulties in manufacturing and the corresponding costs.

As has already been explained above, the transition to the anchoring in the door box 7 by means of the undisturbed hollow profile 13 possessing full resistivity has been especially well implemented according to the invention. A suitable solution has also been provided at the other end, towards the reinforcement profile 8 at the B-pillar. Due to the design, the joint can only be accessed with difficulty on the inside. Because of the additional profile 17, which here terminates before the end of the hollow profile 13 and features the seal attachment formation 16 for the seal 11, this joint to be welded becomes easier to access. The welding can be performed better and more completely. Consequently, small holes or crevices, which due to the design were not accessible so far, can now be accessed. They can now be closed by welding or soldering. This reduces the noise level during driving significantly. This is especially important if one considers that the location in question is at the height of the driver's ears. Noises in this area are registered as exceptionally unpleasant, hence a noise reduction at this location is particularly effective.

Figure 6:
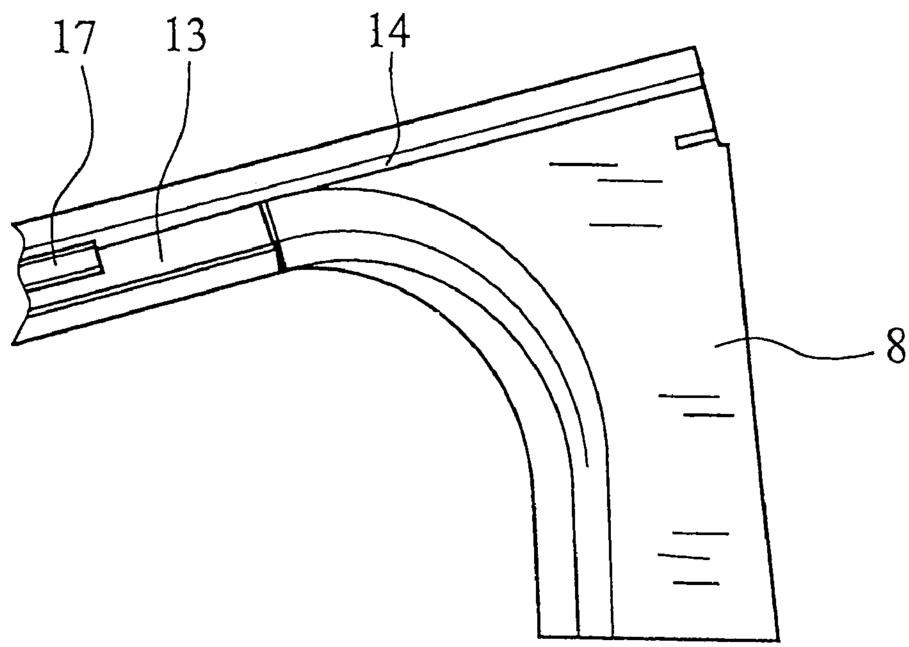
Figure 7:
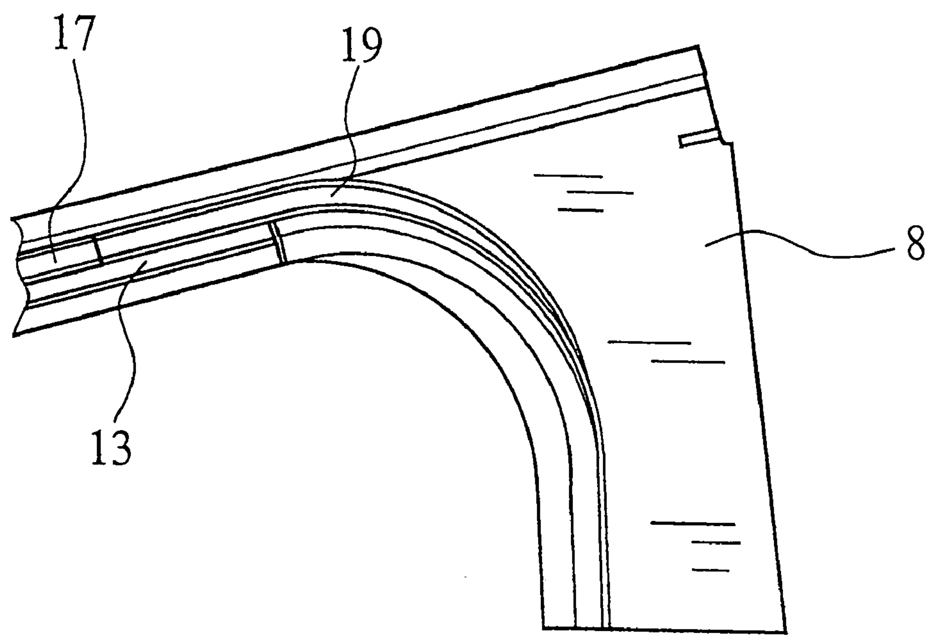

The subsequent polishing of the weld seam can also be carried out more effectively, now that this area is more accessible. Substantial cost savings can be achieved. FIG. 6 shows this concept, while FIG. 7 shows how this corner area is subsequently covered with a seal support rail 19 after the weld seams have been polished.

With regard to production engineering, it is also advantageous that according to the teaching of the invention the profiled frame 2 is straight and not cambered to the outside, and that a design-dependent camber or similar feature is achieved by additional mounted parts, in particular a frame face plate.

With regard to the production technique it is advantageous if the hollow profile 13, the additional profile(s) 17 and, where applicable, the flange 14 are permanently connected, preferably welded, in their straight condition to form the profiled frame 2, and then stretch-bent jointly. This way of manufacturing can be recognized by the stretch-bent marks on the complete profiled frame. Another preferred connection technique which can be used in place of welding, is the soldering of the appropriate components.

The object of the invention is also a complete motor vehicle door or lid, the overall design of which follows the considerations specified with regard to the profiled frame 2.

In a preferred manufacturing method, in the first procedure step the hollow profile 13 is manufactured from flat strip material by roll forming. The flat strip material is preferably flat steel. Apart from steel, light alloy can also be used as the flat strip material for the manufacture of the profiled frame 2, if this is feasible with regard to costs and processing. In the second procedure step, where applicable, the hollow profile 13 can be closed up by means of linear welding along a weld seam 18 which is preferably located within the outside contour of the hollow profile 13. In the third procedure step, an additional profile 17 is produced, featuring at least one seal contact surface 15 and/or one seal attachment formation 16. In the fourth procedure step, this additional profile 17 is permanently connected to the hollow profile 13, in particular welded or soldered as described above.

The third procedure step may be temporally independent from the fist procedure step, if the additional profile is subsequently applied as a separate profiled bar and connected to the hollow profile 13. It is however also possible to weld the additional profile 17 to the hollow profile 13 during the manufacturing roll forming process of the hollow profile 13; this would result in a temporal dependency of the two procedure steps. The course of the third procedure step will be completely independent from the first procedure step, if the additional profile 17 is a profiled bar trimmed in advance and provided in a storage container during the manufacturing process.

It is especially advantageous if the additional profile 17 is manufactured by roll forming from flat strip material, in particular flat steel. With regard to production engineering it is especially advantageous if in the first procedure step a flange 14 is fashioned together with the hollow profile 13 as one piece, said flange 14 following the progression of said hollow profile 13.

In the first steps of another advantageous method, the hollow profile 13, the additional profile(s) 17 and, where applicable, the flange 14 are permanently and rigidly connected in their straight condition to form the profiled frame 2, and then the profiled frame 2 is stretch-bent to obtain its final form in a subsequent fifth procedure step.

According to an especially preferred method, the flange 14 is cut to a desired length at the hollow profile 13 in a sixth procedure step which occurs after the first procedure step and preferably also after the second procedure step, but before the fifth procedure step. In particular, this should be accomplished in such a manner that the weld seam produced in the second procedure step is not damaged. It is however customary to retrim the edges determining the dimensions of the trim on the hollow profile 13 in a subsequent calibrating cut, etc. This incorporates the fact that the stretch bending causes plastic deformations and thus changes in length. This plastic deformation is taken into consideration by providing appropriate calibrating cuts.

If applicable, the stretch bending can also be substituted with roll bending or other appropriate, material related deformation methods, provided their implementation is cost-effective. However, stretch bending has proven advantageous in practical applications.

What is claimed is:

1. A profiled frame which is arranged as a door window frame of a motor vehicle door or lid, the profiled frame comprising:

a hollow profile and an additional profile which is separate from the hollow profile, wherein the hollow profile and the additional profile are each manufactured as a roll-formed profile from metal flat strip material, the additional profile being permanently and rigidly connected with the hollow profile and comprising at least one contact surface or one attachment formation, wherein the additional profile extends over part of the hollow profile, and wherein the length of the hollow profile and the length of the additional profile differ from each other in such a way that the hollow profile features a considerable excess at at least one end for anchoring the profiled frame below the parapet line in a door box of the motor vehicle door or lid.

2. The profiled frame according to claim 1, characterized by the fact that the flat strip material is flat steel.

3. The profiled frame according to claim 1, characterized by the fact that the cross-section of the hollow profile is closed off.

4. The profiled frame according to claim 3, characterized by the fact that the hollow profile features an essentially unchanging cross-section.

5. The profiled frame according to claim 4, characterized by the fact that the additional profile is welded or soldered to the hollow profile.

6. The profiled frame according to claim 1, characterized by the fact that a flange is provided at the hollow profile, following the progression of the hollow profile.

7. The profiled frame according to claim 6, characterized by the fact that the hollow profile or the flange also features a contact surface or an attachment formation.

8. The profiled frame according to claim 6, characterized by the fact that the length of the hollow profile and the length of the flange differ from each other.

9. The profiled frame according to claim 8, characterized by the fact that the length of the additional profile and the length of the flange differ from each other.

10. The profiled frame according to claim 6, characterized by the fact that the length of the additional profile and the length of the flange differ from each other.

11. The profiled frame according to claim 1, characterized by the fact that the additional profile is welded or soldered to the hollow profile.

12. The profiled frame according to claim 1, characterized by the fact that the additional profile is made of flat steel.

13. The profiled frame according to claim 1, characterized by the fact that the hollow profile features an essentially unchanging cross-section.

14. The profiled frame according to claim 1, characterized by the fact that the hollow profile features an excess of 20 mm to 120 mm at at least one end.

15. The profiled frame according to claim 14, characterized by the fact that the hollow profile features an excess of 30 mm to 80 mm at at least one end.

16. The profiled frame according to claim 1, characterized by the fact that the hollow profile is closed off by welding or by soldering.

17. The profiled frame according to claim 16, characterized by the fact that the weld seam of the hollow profile is located within the outer contour of the hollow profile.

18. The profiled frame according to claim 17, characterized by the fact that the additional profile is welded or soldered to the hollow profile.

19. The profiled frame according to claim 1, characterized by the fact that an outside of the profiled frame is straight and not cambered, and that a design-dependent camber is achieved by additional mounted parts.

20. The profiled frame according to claim 1, characterized by the fact that the additional profile, at its end assigned to a B-pillar of the motor vehicle door, is shortened compared to the hollow profile.

21. The profiled frame according to claim 20, characterized by the fact that the additional profile, at its end assigned to a B-pillar of the motor vehicle door, is shortened compared to the hollow profile by 20 mm to 60 mm.

22. The profiled frame according to claim 21, characterized by the fact that the additional profile, at its end assigned to a B-pillar of the motor vehicle door, is shortened compared to the hollow profile by 30 mm to 50 mm.

23. The profiled frame according to claim 1, characterized by the fact that the profiled frame is formed by permanently and rigidly connecting the hollow profile, the additional profile(s) and, where applicable, the flange in their straight condition, and then stretch-bending together.

24. The profiled frame according to claim 1, wherein the profiled frame is a door window frame and is part of a motor vehicle door or lid having an outer door wall, an inner door wall and an interior lining.

25. A method for manufacturing a profiled frame as a door window frame of a motor vehicle door or lid, the method comprising the steps of:

manufacturing a hollow profile from flat strip material by roll-forming, manufacturing an additional profile featuring at least one contact surface or attachment formation from flat strip material by roll-forming, wherein the additional profile is manufactured with a length shorter than the length of the hollow profile, and permanently and rigidly connecting the additional profile with the hollow profile in such a way that the additional profile extends substantially over the full length of the hollow profile but the hollow profile features a considerable excess at at least one end for anchoring the profiled frame below the parapet line in a door box of the motor vehicle door or lid.

26. The manufacturing method according to claim 25, characterized by the fact that the cross-section of the hollow profile is closed off to a closed hollow profile by means of linear welding along a weld seam.

27. The manufacturing method according to claim 25, characterized by the fact that the additional profile is welded or soldered to the hollow profile.

28. The manufacturing method according to claim 25, characterized by the fact that the connection of the additional profile is conducted independent from the manufacturing of the hollow profile.

29. The manufacturing method according to claim 25, characterized by the fact that a flange is fashioned together with the hollow profile as one piece, said flange following the progression of said hollow profile.

30. A method for manufacturing a profiled frame as a window frame or door frame of a motor vehicle door or lid, where the profiled frame features a hollow profile and at least one contact surface or attachment formation on the hollow profile, in which in a first procedure step the hollow profile is manufactured from flat strip material by roll forming, in which in a third procedure step an additional profile is manufactured featuring at least one contact surface or attachment formation, in which in a fourth procedure step the additional profile is permanently and rigidly connected with the hollow profile, characterized by the fact that in the initial procedure steps the profiled frame is formed by permanently and rigidly connecting the hollow profile, the additional profile(s) and, where applicable, the flange in their straight condition, and that only subsequently in a fifth procedure step the profiled frame is stretch-bent to its final form.

31. The manufacturing method according to claim 30, characterized by the fact that in a sixth procedure step occurring after the first procedure step and before the fifth procedure step, the flange is cut the a desired length at the hollow profile.

32. A motor vehicle door comprising:

a profiled frame arranged as a door window frame and comprising a hollow profile and an additional profile which is separate from the hollow profile, wherein the hollow profile and the additional profile are each manufactured as a roll-formed profile from metal flat strip material, the additional profile being permanently and rigidly connected with the hollow profile and comprising at least one contact surface or one attachment formation, wherein the additional profile extends over part of the hollow profile, and wherein the length of the hollow profile and the length of the additional profile differ from each other in such a way that the hollow profile features a considerable excess at at least one end for anchoring the profiled frame below the parapet line in a door box of the motor vehicle door, and wherein the excess of the profiled frame is anchored in the door box of the motor vehicle door or lid.

33. The motor vehicle door of claim 32, wherein the anchoring of the profiled frame is accomplished by welding, soldering, screwing or riveting.

* * * * *